United States Patent [19]
Dyott

[11] Patent Number: 5,323,225
[45] Date of Patent: Jun. 21, 1994

[54] METHOD OF DETERMINING AZIMUTHAL POSITION OF TRANSVERSE AXES OF OPTICAL FIBERS WITH ELLIPTICAL CORES

[75] Inventor: Richard B. Dyott, Oak Lawn, Ill.

[73] Assignee: Andrew Corporation, Orland Park, Ill.

[21] Appl. No.: 935,825

[22] Filed: Aug. 26, 1992

[51] Int. Cl.⁵ .......................................... G01N 21/84
[52] U.S. Cl. .................................................. 356/73.1
[58] Field of Search ....................................... 356/73.1

[56] References Cited

U.S. PATENT DOCUMENTS 4,042,723  8/1977  Presby ................................. 356/73.1

OTHER PUBLICATIONS

Sales literature from Power Technology Incorporated "Single Mode & Multimode Optical Fiber Splicers PFS300 Series" (1989).

*Primary Examiner*—Vincent P. McGraw
*Attorney, Agent, or Firm*—Arnold, White & Durkee

[57] ABSTRACT

A method of locating the azimuthal positions of the transverse axes of an optical fiber that has a cladding and a core with an elliptical cross section, where the elliptical cross section has a major axis and a minor axis and the optical fiber has a longitudinal axis. The present invention also provides a method of detecting the azimuthal position of an optical fiber from which an interference pattern generated by reflections from a coherent light beam directed onto the optical fiber in a direction transverse to the optical fiber's longitudinal axis changes symmetrically as the fiber is turned in opposite directions about its longitudinal axis. In addition, the invention provides a method to determine which axis of an optical fiber elliptical's core, the major axis or the minor axis, is orthogonally aligned with the coherent HeNe laser beam. Further, the invention provides a method of joining two optical fibers where the transverse axes of the fibers' elliptical cores are aligned with one another or are separated from one another at a specified angular separation. The invention also provides a method of detecting the azimuthal positions indicated above utilizing a programmable electronic device capable of storing, retrieving and processing data.

12 Claims, 4 Drawing Sheets

METHOD OF DETERMINING AZIMUTHAL POSITION OF TRANSVERSE AXES OF OPTICAL FIBERS WITH ELLIPTICAL CORES

FIELD OF THE INVENTION

The present invention relates generally to a process of bonding two optical fibers with elliptical cores. More particularly, this invention relates to a method of locating the azimuthal positions of the transverse axes of an optical fiber's elliptical core and joining two optical fibers while the transverse axes of the two fibers' cores have a prescribed relationship to one another.

SUMMARY OF THE INVENTION

It is a primary object of the present invention to provide a method of locating the azimuthal positions of the transverse axes of an optical fiber having an elliptical core.

A related object is to provide a method for detecting the azimuthal position of an optical fiber from which an interference pattern generated by reflections from a coherent laser beam directed onto the optical fiber in a direction transverse to the optical fiber's longitudinal axis changes symmetrically as the fiber is turned about its longitudinal axis.

Another object is to provide a method for determining which transverse axis of an optical fiber having an elliptical core, the major axis or the minor axis, is aligned with a coherent light beam directed onto the fiber in a direction transverse to the optical fiber's longitudinal axis.

A still further object is to provide a method for locating the azimuthal positions of the transverse axes of an optical fiber having an elliptical core, utilizing a programmable electronic device capable of storing, retrieving and processing data.

Still another object of the invention is to provide a method for joining two optical fibers having elliptical cores, while the transverse axes of the optical fibers' elliptical cores are aligned with one another.

Yet another object is to provide a method for joining two optical fibers having elliptical cores, while the transverse axes of the optical fibers' elliptical cores are separated from one another at a specified angular separation.

Other objects and advantages of the invention will be apparent from the following detailed description and the accompanying drawings.

In accordance with the present invention, there is provided a method of locating the azimuthal positions of the transverse axes of an optical fiber's elliptical core. These azimuthal positions are located by monitoring an interference pattern produced by reflections from a coherent light beam directed onto the optical fiber in a direction transverse to the longitudinal axis of the fiber.

As the coherent light beam is directed onto the optical fiber, the fiber is turned about its longitudinal axis. As the fiber is turned, constructive and destructive interference of the reflected light waves occurs, producing visible fringes. When either the major or minor axis of the optical fiber's elliptical core is perpendicular to the coherent light beam, the resulting interference pattern will change symmetrically as the fiber is turned about the optical fiber's longitudinal axis. This symmetry point indicates that the coherent light beam is aligned with either the major or minor axis of the optical fiber's elliptical core.

Although it is possible to align either the major or minor axis of the optical fiber's elliptical core with the coherent light beam, the present invention also provides a method to determine which axis of the optical fiber's core, the major axis or minor axis, is aligned with the coherent light beam. By turning the optical fiber through an azimuthal range of at least 90°, monitoring the rate of change of the resulting interference pattern and realizing the rate of change in the interference pattern is proportional to the rate of change in the elliptical cross section, it is possible to ascertain whether the major axis or the minor axis is approaching a position orthogonal to the coherent light beam. That is, when the minor axis of the optical fiber's elliptical core is approaching a position orthogonal to the coherent light beam, the resulting interference pattern changes more rapidly than when the major axis of the optical fiber's elliptical core is approaching the same relative position orthogonal to the coherent light beam.

After aligning the transverse axes of an optical fiber's elliptical core with a coherent light beam, the transverse axes of a second optical fiber's elliptical core are aligned with the same coherent light beam. By aligning the transverse axes of the two fibers' elliptical cores with the coherent light beam, the transverse axes of the two fibers' elliptical cores are effectively aligned with one another. In addition, by using a rotator device, it is possible to join the optical fibers while the transverse axes of the optical fibers' elliptical cores are separated from one another at a specified angular separation.

BRIEF DESCRIPTION OF THE DRAWINGS

The invention and further objects and advantages of the invention may best be understood by reference to the following description when taken in conjunction with the accompanying drawings, in which:

FIG. 1 is a diagrammatic perspective view of a system for splicing two optical fibers in accordance with the present invention;

DETAILED DESCRIPTION OF THE PREFERRED EMBODIMENT

Figure 2:
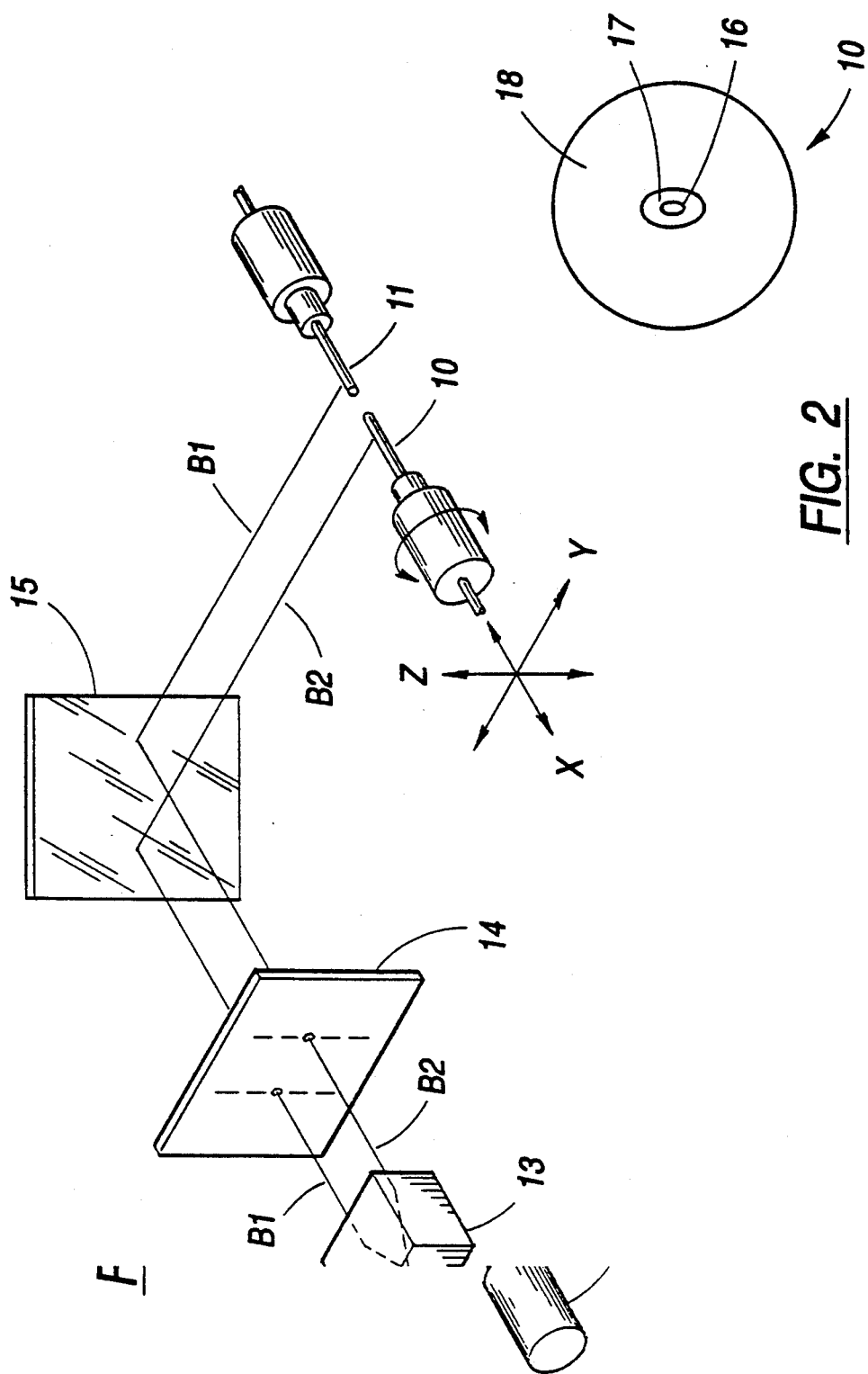
FIG. 2 is an enlarged transverse cross-section of an optical fiber having an elliptical core and cladding.

Although the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

In fiber optic technology it is often necessary to bond or "splice" two optical fibers with their longitudinal axes in precise alignment. When the fibers have elliptical cores, i.e., cores with elliptical transverse cross-sections, it is also desirable to align the transverse axes, i.e., the major and minor axes of the ellipse. In certain applications, it is desired to have the transverse axes of the ellipical cores of the two fibers offset from each other by a preselected angle. The bonding, or splicing, is performed while the transverse axes of the two fibers are in the desired alignment relative to each other. The accuracy of the alignment is predicated upon locating the azimuthal positions of the transverse axes of the fibers' cores prior to splicing.

FIG. 1 illustrates a system for locating the azimuthal positions of the transverse axes of two optical fibers 10 and 11 having elliptical cores. A helium neon (HeNe) laser 12 (wavelength 6328 Å) generates a coherent light beam B which passes through a beamsplitter 13 to form two parallel beams B1 and B2. The beams B1 and B2 are transmitted through two holes in a screen 14 having a white diffuse surface. The two beams are then reflected by a mirror 15 onto the two individual fibers 10 and 11 in a direction perpendicular to the longitudinal axes of the fibers. The longitudinal axes of the beams B1 and B2 preferabl intersect the longitudinal axes of the fibers 10 and 11.

As the laser beam passes through the fibers, a portion of the beam is reflected from the front and back surfaces of the fibers, and also from the interior interfaces between the core and cladding regions of the fibers. The vector sum of the individual, reflected light waves creates an interference pattern that is reflected onto the screen. The constructive and destructive vectorial addition of the reflected light waves produces alternating light and dark regions, commonly referred to as fringes.

Although reflections from the internal interfaces of both the cladding and core regions produce fringes, it is possible to differentiate the core fringes from the cladding fringes. Typically, the length of a fringe is inversely proportional to the dimension of the source generating the fringe. Since the core dimensions are substantially smaller than the cladding dimensions, the fringes produced by reflections from the core are substantially longer than the fringes produced by reflections from the cladding.

As illustrated in FIG. 2, each of the optical fibers 10 and 11 has an elliptical core 16 with a relatively high index of refraction surrounded by a cladding 17 with a lower index of refraction to produce a high difference in index (e.g., a $\Delta n$ of 0.035). The dimensions and the refractive indicies of the core 16 and the cladding 17 are selected to provide a single-mode guiding region. Because of its elliptical shape and high index difference, this guiding region will also hold the polarization of optical signals propagated therethrough in alignment with either axis of the ellipse. That is, the major and minor axes of the elliptical cross-section represent two transverse orthogonal axes which, in combination with the refractive indicies of the core and cladding, de-couple light waves polarized along those axes.

Surrounding the guiding region formed by the core 16 and cladding 17 is a support layer 18 which provides the fiber with increased mechanical strength and ease of manipulation. Since this support layer 18 is not a part of the guiding region, its optical properties are not nearly as critical as those of the core 16 and the cladding 17. To prevent light from being trapped in the cladding 17, the support layer 18 has an index of refraction higher than that of the cladding 17.

Figure 3:
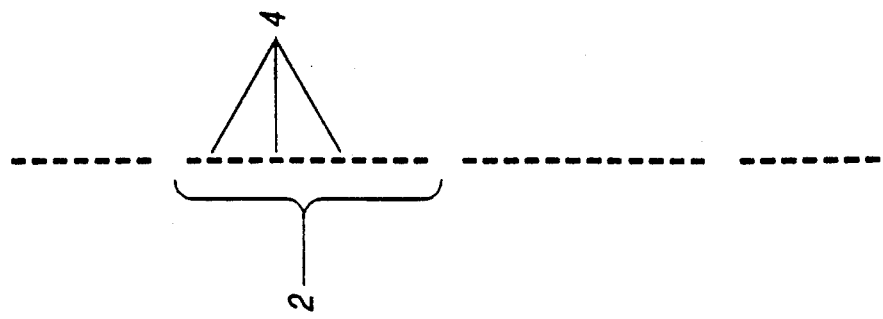
FIG. 3 is a representation of fringes produced by constructive interference of a coherent light beam reflected from the cladding and core regions of an optical fiber.

FIG. 3 shows a typical pattern of four fringes produced by directing a coherent HeNe laser beam onto an optical fiber having an elliptical core. This pattern includes both core fringes 20 and cladding fringes 21. The cladding fringes 21 are substantially smaller than the core fringes 20, and it is preferred to use the core fringes 20 to align the transverse axes of the two fibers 10 an 11.

The azimuthal locations of the minor and major axes of the elliptical core can be determined by turning the optical fiber around its longitudinal axis while monitoring the interference pattern produced by reflections of the laser beam from the elliptical core. By monitoring the interference pattern, it is possible to determine when each of the major and minor axes of the fiber's elliptical core is aligned with the axis of the laser beam. FIGS. 4 through 7 are examples of interference patterns produced as a fiber is rotated around its longitudinal axis.

Figure 4:
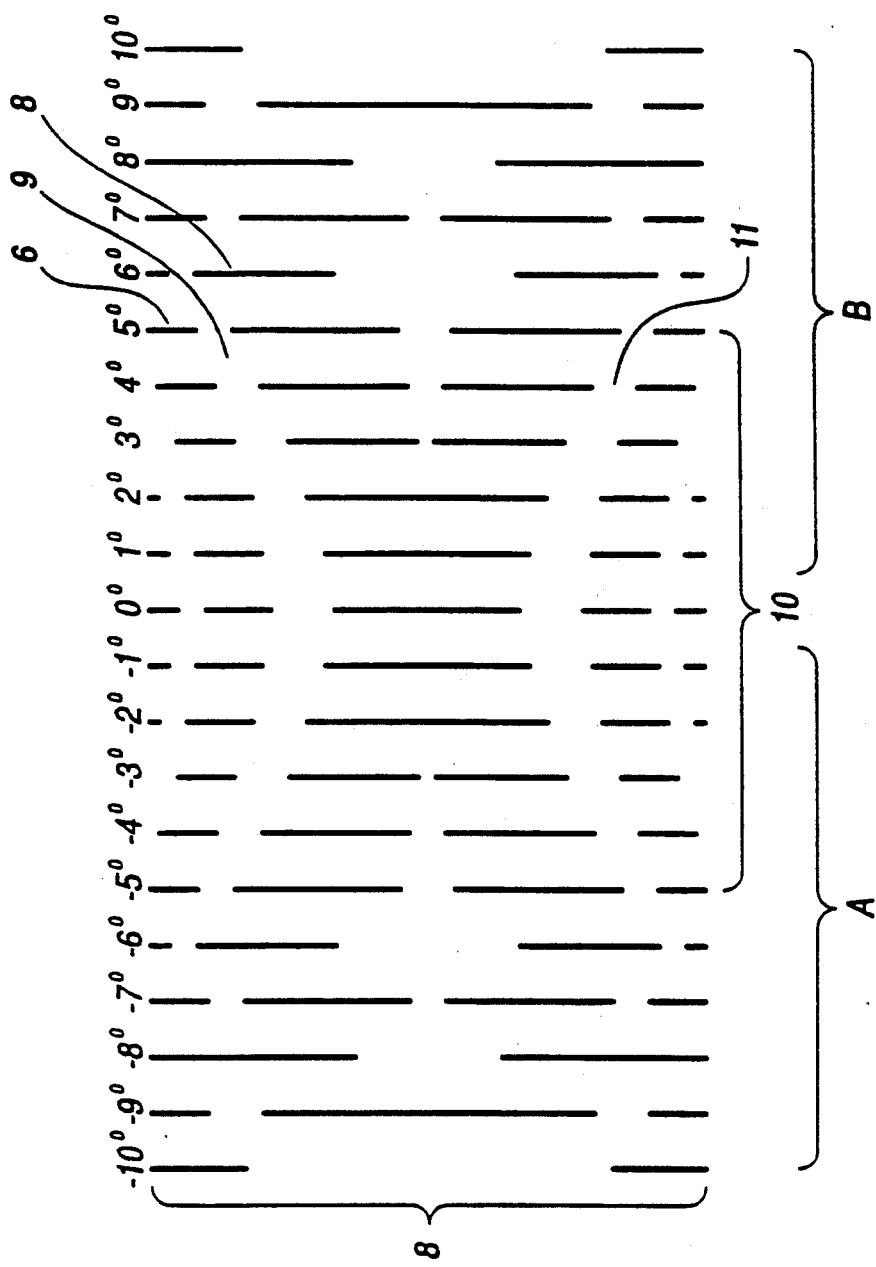
FIG. 4 is a representation of the interference pattern produced as the minor axis of an optical fiber's elliptical core approaches a position perpendicular to a coherent light beam.

FIG. 4 illustrates an example of an interference pattern produced as the minor axis of the fiber's elliptical core approaches a position orthogonal to the laser beam. The vertical lines represent core fringes produced by constructive vectorial addition of the reflected laser beam, and the blank spaces between the vertical lines represent core fringes produced by destructive vectorial addition of the reflected laser beam. The core fringes illustrated in FIG. 4 are interwoven with the smaller cladding fringes, though these cladding fringes are not illustrated in FIG. 4.

The 0° reference point in FIG. 4 indicates the azimuthal position of the fiber when the axis of the laser beam is parallel to the major axis of the fiber's elliptical core. Since the major and minor axes of the elliptical core are orthogonal, when one of the axes is perpendicular to the beam, the other axis is parallel to the beam. Thus, in FIG. 4, the minor axis of the fiber's elliptical core is perpendicular the axis of the laser beam at the 0° reference point.

The interference pattern illustrated in FIG. 4 is shown at successive one-degree increments to illustrate the proportional change in the interference pattern with respect to the angular rotation of the fiber about its longitudinal axis. If it is assumed that the fiber's rotation begins at the position $-10°$ in FIG. 5, it can be seen that as the fiber is rotated toward the 0° position, the fringes $F_1$ and $F_2$ converge at the center of the pattern, i.e., at the point corresponding to a plane passing through the axes of both the fiber and the laser beam. After the central fringes $F_1$ and $F_2$ converge, the length of the central fringe $F_c$ diminishes until the fiber is rotated to the 0° position, at which point the length of the central fringe $F_c$ reaches a minimum. Then as the fiber is rotated past the 0° position toward the $+10°$ position, the central fringe $F_c$ increases in length, and then separates into two fringes $F_1$ and $F_2$ again. As fiber rotation continues, the two central fringes $F_1$ and $F_2$ diverge.

Figure 5:
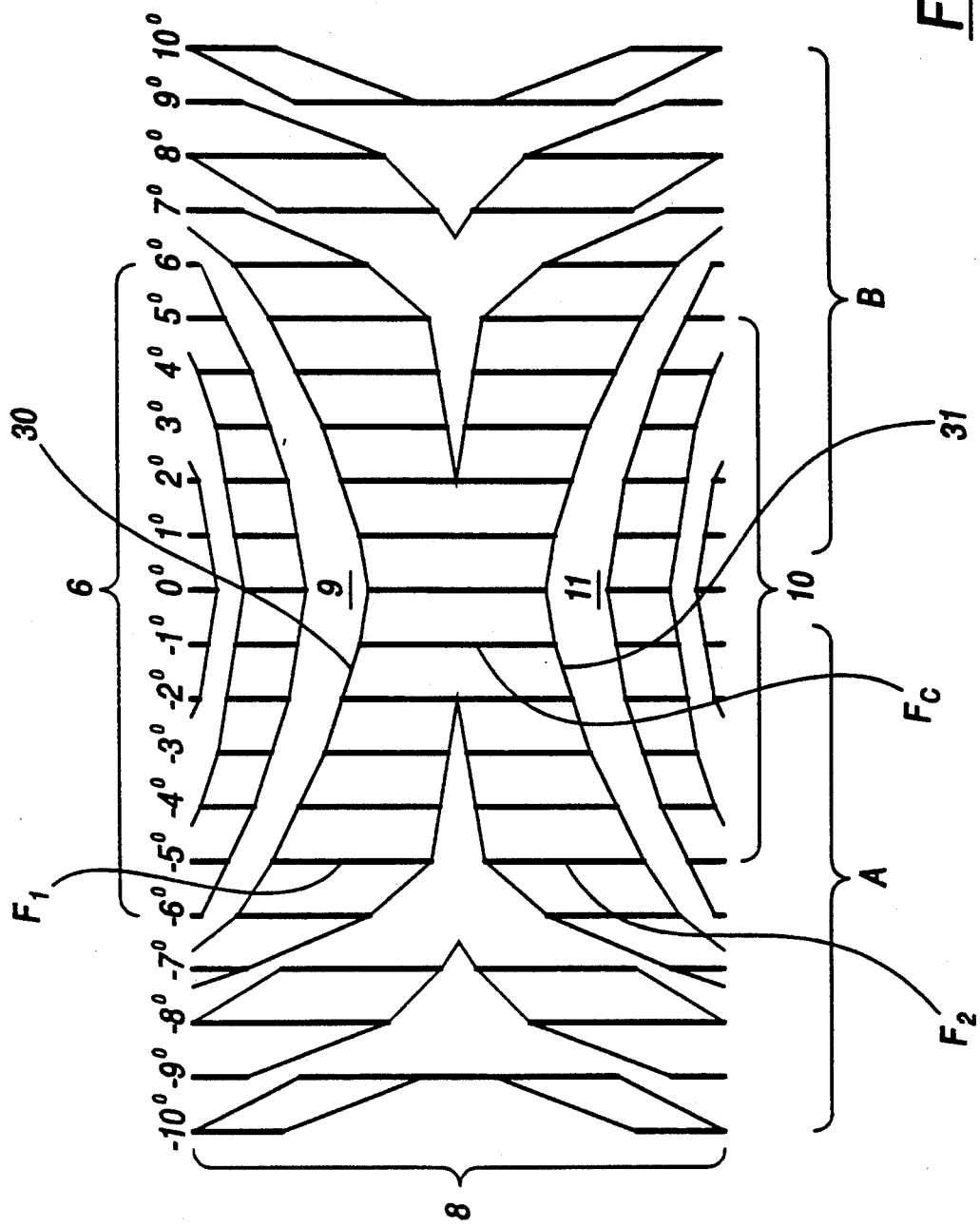
FIG. 5 is a representation of the interference pattern of FIG. 4 with enveloping lines added to emphasize the symmetrical arrangement of the resulting fringes.

It can be seen in FIG. 5 that the fringes produced on opposite sides of the 0° position are identical for identical angular displacements from the 0° position. For example, the fringes produced at $-5°$ are identical to the fringes produced at $+5°$. Thus, the 0° position establishes an axis of symmetry, i.e., the fringes produced on one side of the 0° position are a mirror image of the fringes produced on the other side of the 0° position.

Figure 6:
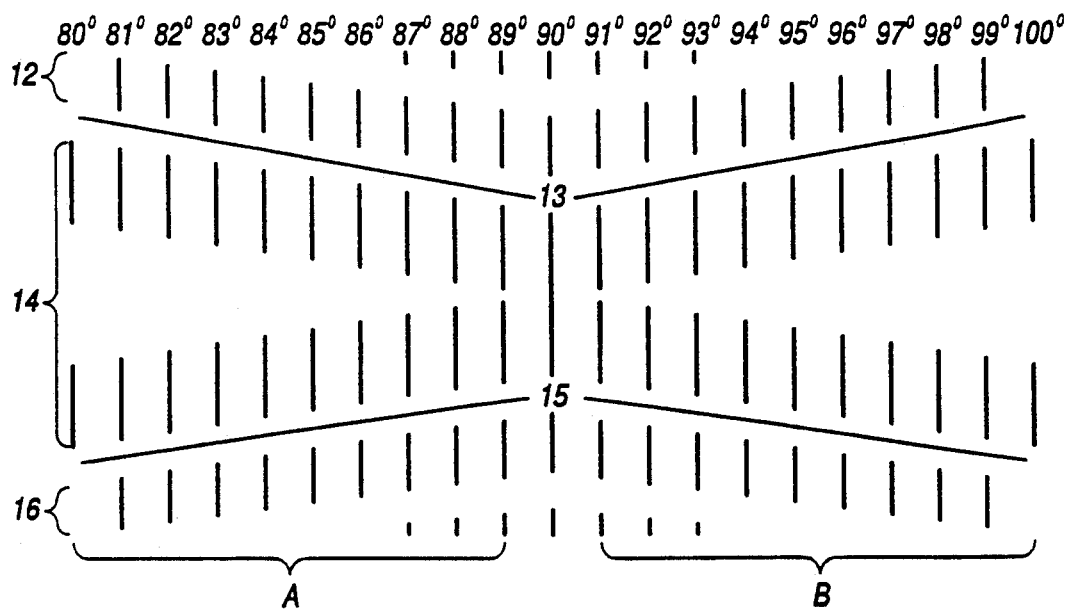
FIG. 6 is a representation of an interference pattern produced as the major axis of an optical fiber's elliptical core approaches a position perpendicular to a coherent light beam.
Figure 7:
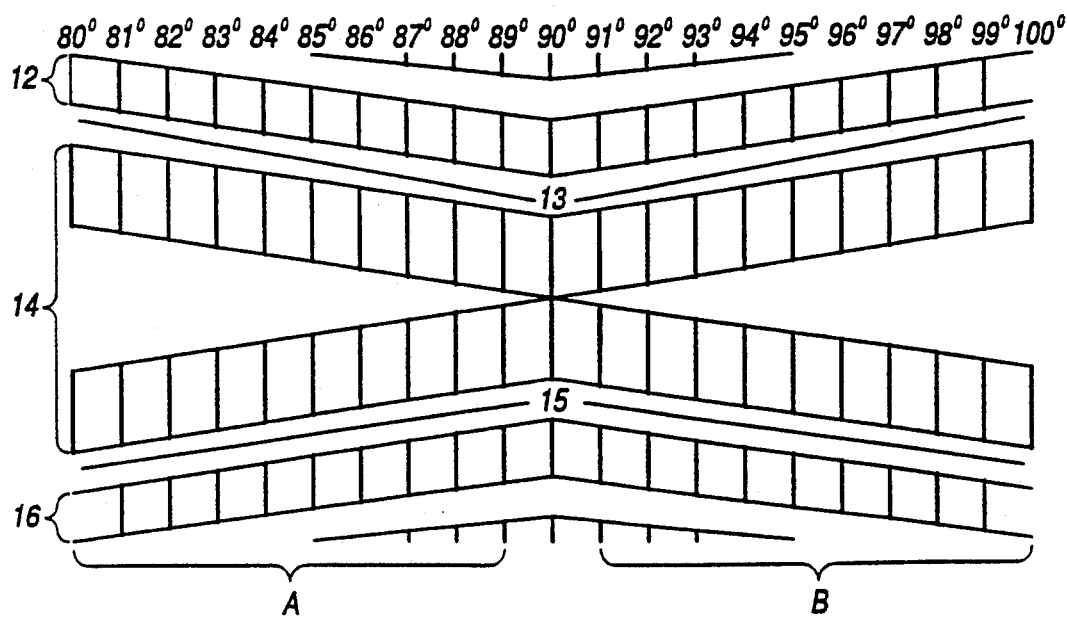
FIG. 7 is a representation of the interference pattern of FIG. 6 with enveloping lines added to emphasize the symmetrical arrangement of the resulting fringes.

Referring to FIG. 6, the axis of symmetry at the 0° position is emphasized by adding envelope lines to show the progressive displacement of the fringes with respect to the angular rotation of the fiber. This added enveloping also emphasizes the mirror images produced as the fiber is rotated through equal angular displacements on both sides of the 0° position. Thus, it can be seen that as the fiber is rotated from the +10° position to the −10° position, the envelopes of the resulting fringes form patterns A and B which are mirror images of each other. The 0° position marks the axis of symmetry between the two patterns A and B. This axis of symmetry is the position at which the minor axis of the fiber's elliptical core is orthogonal to the axis of the laser beam.

An alternative technique for determining when the minor axis of the optical fiber's elliptical core is orthogonal to the axis of the laser beam, as the optical fiber is turned about its longitudinal axis, is to monitor the sum of the lengths of the two central fringes between the two envelopes 30 and 31 in FIG. 5 and detect when that sum reaches a minimum. As can be seen in FIG. 5, that sum reaches a minimum at the 0° position. If the fiber is rotated to either side of the 0° position, the sum of the fringe lengths between the two envelopes 30 and 31 increases.

The tracking of the fringes described above may be accomplished by manual or automated means. First, it is possible to manually measure or estimate the sum of the lengths of the central fringes. Second, the tracking process can be automated by the use of a register which stores the sum of the central fringe lengths. As the optical fiber is turned about its longitudinal axis, the sum of the central fringe lengths is measured at successive increments, and each such measurement is compared with the value of the previous measurement stored in the register. If the current measurement is less than the value stored in the register, the stored value is replaced with the current measurement value. If the current measurement value exceeds the value stored in the register, the stored value is not replaced because this condition indicates that the sum of the central fringe lengths has reached a minimum or has increased. The minimum value is the last stored value before an increase occurs, and indicates that the minor axis of the fiber's elliptical core is perpendicular to the axis of the laser beam.

It is also possible to determine which axis of the elliptical core, the major axis or the minor axis, is perpendicular to the axis of the laser beam. Generally, the core surface area illuminated by the laser beam changes with rotation of the fiber around its longitudinal axis. If the same angular rotation is performed first with the minor axis of the ellipse orthogonal to the beam axis, and second with the major axis of the ellipse orthogonal to the beam axis, it can be seen that the rate of change in the illuminated core surface area is substantially larger when the minor axis of the ellipse is orthogonal to the reference point. Consequently, the interference pattern changes most rapidly when the minor axis of the elliptical core is perpendicular to the axis beam. This can be seen by comparing the interference patterns illustrated in FIGS. 4 and 5 with the interference patterns illustrated in FIGS. 6 and 7, which illustrate examples of interference patterns produced as the major axis of the fiber's elliptical core approaches a position orthogonal to the axis of the laser beam. In FIGS. 4 and 5, where the minor axis of the fiber's elliptical core is perpendicular to the laser beam axis at the 0° position, the rate of change of the interference pattern exceeds the rate of change of the interference pattern in FIGS. 6 and 7, where the major axis of the fiber's elliptical core is perpendicular to the laser beam axis at the 90° position. Therefore, by rotating the fiber through an angle of approximately 90° and monitoring the rate of change of the interference pattern, it is possible to determine which axis of the elliptical core is perpendicular to the beam axis at whatever axis of symmetry is detected within that 90°. The sum of the central fringe lengths is another variable that can be used to determine which axis of the optical fiber's elliptical core, the major axis or the minor axis, is orthogonal to the axis of the laser beam. When the minor axis of the elliptical core is orthogonal to the beam axis, the sum of the two central fringe lengths is greater than the sum of those fringe lengths when the major axis is orthogonal to the beam axis. Thus, by storing the minimum value of one or both of these sums in memory, and comparing any current sum with the stored value or values, it can be determined whether the minor axis or the major axis is orthogonal to the beam axis.

Although either the major or minor axis can be used to determine the precise positions of the fiber's transverse axes, it is preferred to use the interference patterns shown in FIGS. 4 and 5 because the interference pattern changes most rapidly when the minor axis of the elliptical core is orthogonal to the beam axis. The greater rate of change means that changes in the interference pattern are more obvious when the minor axis approaches a position orthogonal to the beam axis. By aligning the major and minor axes of the elliptical cores of two optical fibers with the axes of the two coplanar laser beams, B1 and B2, the major and minor axes of the two fibers can be precisely aligned with each other.

To form a fiber splice, the two fibers 10 and 11 in FIG. 1 are initially moved into precise alignment with each other along the X, Y and Z axes. As illustrated in FIG. 1, the X and Y axes are orthogonal axes in the horizontal plane, and the Z axis is the vertical axis orthogonal to both the X and Y axes. The two fibers 10 and 11 may be moved along these three mutually orthogonal axes by a conventional X-Y-Z indexing system until the longitudinal axes of the two fibers are in precise register with each other. Each fiber is then rotated to position the major and minor axes of its eliptical core in precisely the desired angular position relative to the axis of the laser beam impinging thereon. Of course, when both fibers 10 and 11 have been so positioned, the relationship of the major and minor axes of the eliptical cores of the two fibers relative to each other are also precisely known. It most applications, it is desired to splice the two fibers with the minor axes of the eliptical cores of the two fibers in precise register with each other, which also means that the major axes of the eliptical cores of the two fibers are in register with each other. When the two fibers 10 and 11 have been properly positioned, one or both of the fibers is advanced along the X axis to bring the free ends of the two fibers into engagement or close proximity with each other, and the free ends of the fibers are then fused together. Techniques for fusing two optical fibers are well known in the art and will not be repeated here. For example, automated devices for performing such fusion are commercially available from Power Technology Inc. of Little Rock, Ark.

This invention is also useful in joining fibers for applications requiring optical fibers to be joined with their transverse axes offset from each other by preselected angles. This can be accomplished by first aligning the transverse axes of the two fibers as indicated above and then rotating one of the fibers through the desired offset angle. Alternatively, the two fibers could be independently positioned at their respective desired angles.

I claim:

1. A method of locating azimuthal positions of transverse axes of an optical fiber having a cladding and a core with an elliptical transverse cross-section having major and minor axes, said optical fiber having a longitudinal axis, said method comprising the steps of:

directing a coherent light beam onto said fiber, in a direction transverse to said longitudinal axis of said optical fiber, monitoring an interference pattern produced by reflections of said coherent light beam from the surface of the fiber and the internal interfaces of said core and cladding, while turning said fiber about said longitudinal axis, and detecting the azimuthal position of said fiber from which said interference pattern changes symmetrically as the fiber is turned in opposite directions about said longitudinal axis, indicating said coherent light beam is aligned with one of said major and minor axes at said detected azimuthal position.

2. The method of claim 1 wherein said coherent light beam is produced by a helium neon laser.

3. The method of claim 1 wherein said coherent light beam is normal to said longitudinal axis of said optical fiber.

4. The method of claim 1 further comprising the step of turning said optical fiber through an azimuthal range of at least 90°.

5. The method of claim 1 further comprising the step of detecting which one of said major and minor axes is aligned with said coherent light beam.

6. The method of claim 1 further comprising the step of repeating said direction monitoring and detecting steps with a second optical fiber.

7. A method of locating azimuthal positions of transverse axes of an optical fiber having a cladding and a core with an elliptical transverse cross-section having major and minor axes, said optical fiber having a longitudinal axis, said method comprising the steps of:

directing a coherent light beam onto said fiber, in a direction transverse to said longitudinal axis of said optical fiber, utilizing a programmable electronic device capable of storing, retrieving and processing data to monitor an interference pattern produced by reflections of said coherent light beam from the internal interfaces of said core and cladding, while turning said fiber about said longitudinal axis, and detecting the azimuthal position of said fiber from which said interference pattern changes symmetrically as the fiber is turned in opposite directions about said longitudinal axis, indicating said coherent light beam is aligned with one of said major and minor axes at said detected azimuthal position.

8. The method of claim 7 wherein said coherent light beam is produced by a helium neon laser.

9. The method of claim 7 wherein said coherent light beam is normal to said longitudinal axis of said optical fiber.

10. The method of claim 7 further comprising the step of turning said optical fiber through an azimuthal range of at least 90°.

11. The method of claim 7 further comprising the step of detecting which one of said major and minor axes is aligned with said coherent light beam.

12. The method of claim 7 further comprising the step of repeating said direction monitoring and detecting steps with a second optical fiber.

* * * * *